US008561598B2

(12) United States Patent
McAlister

(10) Patent No.: US 8,561,598 B2
(45) Date of Patent: *Oct. 22, 2013

(54) METHOD AND SYSTEM OF THERMOCHEMICAL REGENERATION TO PROVIDE OXYGENATED FUEL, FOR EXAMPLE, WITH FUEL-COOLED FUEL INJECTORS

(75) Inventor: Roy E. McAlister, Phoenix, AZ (US)

(73) Assignee: McAlister Technologies, LLC, Phoenix, AZ (US)

(*) Notice: Subject to any disclaimer, the term of this patent is extended or adjusted under 35 U.S.C. 154(b) by 142 days.

This patent is subject to a terminal disclaimer.

(21) Appl. No.: 12/804,509

(22) Filed: Jul. 21, 2010

(65) Prior Publication Data

US 2011/0036309 A1   Feb. 17, 2011

Related U.S. Application Data

(60) Continuation-in-part of application No. 12/653,085, filed on Dec. 7, 2009, which is a continuation-in-part of application No. PCT/US2009/067044, filed on Dec. 7, 2009, and a continuation-in-part of application No. 12/581,825, filed on Oct. 19, 2009, now Pat. No. 8,297,254, which is a division of application No. 12/006,774, filed on Jan. 7, 2008, now Pat. No. 7,628,137, which is a continuation-in-part of application No. 12/006,774, filed on Jan. 7, 2008, now Pat. No. 7,628,137.

(60) Provisional application No. 61/312,100, filed on Mar. 9, 2010, provisional application No. 61/304,403, filed on Feb. 13, 2010, provisional application No. 61/237,425, filed on Aug. 27, 2009, provisional application No. 61/237,479, filed on Aug. 27, 2009, provisional application No. 61/237,466, filed on Aug. 27, 2009.

(51) Int. Cl.
 *F02M 51/00* (2006.01)
 *F02M 15/00* (2006.01)

(52) U.S. Cl.
 USPC .......................................... 123/541; 123/490

(58) Field of Classification Search
 USPC .......... 123/297, 541, 499, 498, 490; 239/132.5, 132, 132.1, 132.3, 102.2, 239/585.1
 See application file for complete search history.

(56) References Cited

U.S. PATENT DOCUMENTS 1,451,384 A   4/1923   Whyte
1,765,237 A   7/1938   King
(Continued)

FOREIGN PATENT DOCUMENTS

DE   3443022 A1   5/1986
DE   10308914 A1 * 9/2004
(Continued)

OTHER PUBLICATIONS

"Ford DIS/EDIS 'Waste Spark' Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

(Continued)

*Primary Examiner* — Mahmoud Gimie
(74) *Attorney, Agent, or Firm* — Perkins Coie LLP

(57) ABSTRACT

The present disclosure is directed to integrated injector/igniters providing efficient injection, ignition, and complete combustion of various types of fuels. One example of such an injectors/igniter can include a body having a base portion opposite a nozzle portion. The base portion receives the fuel into the body and the nozzle portion can be positioned adjacent to the combustion chamber. The injector further includes a valve carried by the nozzle portion that is movable between a closed position and an open position to inject the fuel into the combustion chamber. An actuator is coupled the valve and extends longitudinally through the body towards the base portion, and a driver is carried by the body and is movable between a first position and a second position. Thermochemical regeneration of waste heat produced by combustion and associated combustion events is captured and invested in endothermic reactions to improve efficiency of the combustion event. Hydrogen characterized fuel may be used as a heat sink.

20 Claims, 6 Drawing Sheets

(56) References Cited

U.S. PATENT DOCUMENTS

| | | | |
|---|---|---|---|
| 2,255,203 A | 9/1941 | Wiegand | |
| 2,441,277 A | 5/1948 | Lamphere | |
| 2,721,100 A | 10/1955 | Bodine, Jr. | |
| 3,058,453 A | 10/1962 | May | |
| 3,060,912 A | 10/1962 | May | |
| 3,081,758 A | 3/1963 | May | |
| 3,243,335 A | 3/1966 | Faite | |
| 3,286,164 A | 11/1966 | De Huff | |
| 3,373,724 A | 3/1968 | Papst | |
| 3,391,680 A * | 7/1968 | Benson | 123/297 |
| 3,520,961 A | 7/1970 | Suda et al. | |
| 3,594,877 A | 7/1971 | Suda et al. | |
| 3,608,050 A | 9/1971 | Carman et al. | |
| 3,689,293 A | 9/1972 | Beall | |
| 3,926,169 A | 12/1975 | Leshner et al. | |
| 3,931,438 A | 1/1976 | Beall et al. | |
| 3,960,995 A | 6/1976 | Kourkene | |
| 3,976,039 A | 8/1976 | Henault | |
| 3,997,352 A | 12/1976 | Beall | |
| 4,020,803 A | 5/1977 | Thuren et al. | |
| 4,066,046 A | 1/1978 | McAlister | |
| 4,095,580 A | 6/1978 | Murray et al. | |
| 4,105,004 A | 8/1978 | Asai et al. | |
| 4,116,389 A * | 9/1978 | Furtah et al. | 239/132.5 |
| 4,122,816 A | 10/1978 | Fitzgerald et al. | |
| 4,135,481 A | 1/1979 | Resler, Jr. | |
| 4,172,921 A | 10/1979 | Kiefer | |
| 4,183,467 A | 1/1980 | Sheraton et al. | |
| 4,203,393 A | 5/1980 | Giardini | |
| 4,281,797 A | 8/1981 | Kimata et al. | |
| 4,293,188 A | 10/1981 | McMahon | |
| 4,330,732 A | 5/1982 | Lowther | |
| 4,332,223 A | 6/1982 | Dalton | |
| 4,364,342 A | 12/1982 | Asik | |
| 4,364,363 A | 12/1982 | Miyagi et al. | |
| 4,368,707 A | 1/1983 | Leshner et al. | |
| 4,377,455 A | 3/1983 | Kadija et al. | |
| 4,381,740 A | 5/1983 | Crocker | |
| 4,382,189 A | 5/1983 | Wilson | |
| 4,391,914 A | 7/1983 | Beall | |
| 4,448,160 A | 5/1984 | Vosper | |
| 4,469,160 A | 9/1984 | Giamei | |
| 4,483,485 A | 11/1984 | Kamiya et al. | |
| 4,511,612 A | 4/1985 | Huther et al. | |
| 4,528,270 A | 7/1985 | Matsunaga | |
| 4,536,452 A | 8/1985 | Stempin et al. | |
| 4,567,857 A | 2/1986 | Houseman et al. | |
| 4,574,037 A | 3/1986 | Samejima et al. | |
| 4,677,960 A | 7/1987 | Ward | |
| 4,684,211 A | 8/1987 | Weber et al. | |
| 4,688,538 A | 8/1987 | Ward et al. | |
| 4,700,891 A * | 10/1987 | Hans et al. | 239/132.5 |
| 4,716,874 A | 1/1988 | Hilliard et al. | |
| 4,733,646 A | 3/1988 | Iwasaki | |
| 4,736,718 A | 4/1988 | Linder | |
| 4,742,265 A | 5/1988 | Giachino et al. | |
| 4,760,818 A | 8/1988 | Brooks et al. | |
| 4,760,820 A | 8/1988 | Tozzi | |
| 4,774,914 A | 10/1988 | Ward | |
| 4,774,919 A | 10/1988 | Matsuo et al. | |
| 4,777,925 A | 10/1988 | LaSota | |
| 4,834,033 A | 5/1989 | Larsen | |
| 4,841,925 A | 6/1989 | Ward | |
| 4,922,883 A | 5/1990 | Iwasaki | |
| 4,932,263 A | 6/1990 | Wlodarczyk | |
| 4,967,708 A | 11/1990 | Linder et al. | |
| 4,977,873 A | 12/1990 | Cherry et al. | |
| 4,982,708 A | 1/1991 | Stutzenberger | |
| 5,034,852 A | 7/1991 | Rosenberg | |
| 5,035,360 A | 7/1991 | Green et al. | |
| 5,036,669 A | 8/1991 | Earleson et al. | |
| 5,055,435 A | 10/1991 | Hamanaka et al. | |
| 5,056,496 A | 10/1991 | Morino et al. | |
| 5,069,189 A * | 12/1991 | Saito | 123/533 |
| 5,072,617 A | 12/1991 | Weiss | |
| 5,076,223 A | 12/1991 | Harden et al. | |
| 5,095,742 A | 3/1992 | James et al. | |
| 5,107,673 A | 4/1992 | Sato et al. | |
| 5,109,817 A | 5/1992 | Cherry | |
| 5,131,376 A | 7/1992 | Ward et al. | |
| 5,150,682 A | 9/1992 | Magnet | |
| 5,193,515 A | 3/1993 | Oota et al. | |
| 5,207,208 A | 5/1993 | Ward | |
| 5,211,142 A | 5/1993 | Matthews et al. | |
| 5,220,901 A | 6/1993 | Morita et al. | |
| 5,222,481 A | 6/1993 | Morikawa | |
| 5,267,601 A | 12/1993 | Dwivedi | |
| 5,297,518 A | 3/1994 | Cherry | |
| 5,305,360 A | 4/1994 | Remark et al. | |
| 5,328,094 A | 7/1994 | Goetzke et al. | |
| 5,329,606 A | 7/1994 | Andreassen | |
| 5,343,699 A | 9/1994 | McAlister | |
| 5,377,633 A | 1/1995 | Wakeman | |
| 5,390,546 A | 2/1995 | Wlodarczyk | |
| 5,392,745 A | 2/1995 | Beck | |
| 5,394,838 A | 3/1995 | Chandler | |
| 5,394,852 A | 3/1995 | McAlister | |
| 5,421,195 A | 6/1995 | Wlodarczyk | |
| 5,421,299 A | 6/1995 | Cherry | |
| 5,435,286 A | 7/1995 | Carroll, III et al. | |
| 5,439,532 A | 8/1995 | Fraas | |
| 5,456,241 A | 10/1995 | Ward | |
| 5,475,772 A | 12/1995 | Hung et al. | |
| 5,497,744 A | 3/1996 | Nagaosa et al. | |
| 5,517,961 A | 5/1996 | Ward | |
| 5,531,199 A | 7/1996 | Bryant et al. | |
| 5,549,746 A | 8/1996 | Scott et al. | |
| 5,568,801 A | 10/1996 | Paterson et al. | |
| 5,584,490 A | 12/1996 | Inoue et al. | |
| 5,588,299 A | 12/1996 | DeFreitas | |
| 5,605,125 A | 2/1997 | Yaoita | |
| 5,607,106 A | 3/1997 | Bentz et al. | |
| 5,608,832 A | 3/1997 | Pfandl et al. | |
| 5,662,389 A | 9/1997 | Truglio et al. | |
| 5,676,026 A | 10/1997 | Tsuboi et al. | |
| 5,694,761 A | 12/1997 | Griffin, Jr. | |
| 5,699,253 A | 12/1997 | Puskorius et al. | |
| 5,702,761 A | 12/1997 | DiChiara, Jr. et al. | |
| 5,704,321 A | 1/1998 | Suckewer et al. | |
| 5,704,553 A | 1/1998 | Wieczorek et al. | |
| 5,714,680 A | 2/1998 | Taylor et al. | |
| 5,715,788 A | 2/1998 | Tarr et al. | |
| 5,738,818 A | 4/1998 | Atmur et al. | |
| 5,745,615 A | 4/1998 | Atkins et al. | |
| 5,746,171 A | 5/1998 | Yaoita | |
| 5,767,026 A | 6/1998 | Kondoh et al. | |
| 5,797,427 A | 8/1998 | Buescher | |
| 5,806,581 A | 9/1998 | Haasch et al. | |
| 5,816,217 A | 10/1998 | Wong | |
| 5,853,175 A | 12/1998 | Udagawa | |
| 5,863,326 A | 1/1999 | Nause et al. | |
| 5,876,659 A | 3/1999 | Yasutomi et al. | |
| 5,915,272 A | 6/1999 | Foley et al. | |
| 5,930,420 A | 7/1999 | Atkins et al. | |
| 5,941,207 A | 8/1999 | Anderson et al. | |
| 5,947,091 A | 9/1999 | Krohn et al. | |
| 5,975,032 A | 11/1999 | Iwata | |
| 5,983,855 A * | 11/1999 | Benedikt et al. | 123/297 |
| 6,000,628 A * | 12/1999 | Lorraine | 239/87 |
| 6,015,065 A | 1/2000 | McAlister | |
| 6,017,390 A | 1/2000 | Charych et al. | |
| 6,026,568 A | 2/2000 | Atmur et al. | |
| 6,029,627 A | 2/2000 | VanDyne | |
| 6,042,028 A | 3/2000 | Xu | |
| 6,062,498 A | 5/2000 | Klopfer | |
| 6,081,183 A | 6/2000 | Mading et al. | |
| 6,085,990 A | 7/2000 | Augustin | |
| 6,092,501 A | 7/2000 | Matayoshi et al. | |
| 6,092,507 A | 7/2000 | Bauer et al. | |
| 6,093,338 A | 7/2000 | Tani et al. | |
| 6,102,303 A | 8/2000 | Bright et al. | |
| 6,131,607 A | 10/2000 | Cooke | |
| 6,138,639 A | 10/2000 | Hiraya et al. | |
| 6,155,212 A | 12/2000 | McAlister | |

(56) References Cited

U.S. PATENT DOCUMENTS

| | | |
|---|---|---|
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,335,065 B1 | 1/2002 | Steinlage et al. |
| 6,338,445 B1 | 1/2002 | Lambert et al. |
| 6,340,015 B1 | 1/2002 | Benedikt et al. |
| 6,360,721 B1 | 3/2002 | Schuricht et al. |
| 6,378,485 B2 | 4/2002 | Elliott |
| 6,386,178 B1 | 5/2002 | Rauch |
| 6,446,597 B1 | 9/2002 | McAlister |
| 6,453,660 B1 | 9/2002 | Johnson et al. |
| 6,455,173 B1 | 9/2002 | Marijnissen et al. |
| 6,455,451 B1 | 9/2002 | Brodkin et al. |
| 6,478,007 B2 | 11/2002 | Miyashita et al. |
| 6,483,311 B1 | 11/2002 | Ketterer et al. |
| 6,490,391 B1 | 12/2002 | Zhao et al. |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,517,623 B1 | 2/2003 | Brodkin et al. |
| 6,532,315 B1 | 3/2003 | Hung et al. |
| 6,536,405 B1 | 3/2003 | Rieger et al. |
| 6,542,663 B1 | 4/2003 | Zhao et al. |
| 6,543,700 B2 | 4/2003 | Jameson et al. |
| 6,549,713 B1 | 4/2003 | Pi et al. |
| 6,550,458 B2 | 4/2003 | Yamakado et al. |
| 6,556,746 B1 | 4/2003 | Zhao et al. |
| 6,561,168 B2 | 5/2003 | Hokao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |
| 6,585,171 B1 | 7/2003 | Boecking |
| 6,587,239 B1 | 7/2003 | Hung |
| 6,599,028 B1 | 7/2003 | Shu et al. |
| 6,615,810 B2 | 9/2003 | Funk et al. |
| 6,615,899 B1 | 9/2003 | Woodward et al. |
| 6,619,269 B1 * | 9/2003 | Stier et al. .................... 123/490 |
| 6,621,964 B2 | 9/2003 | Quinn et al. |
| 6,647,948 B2 | 11/2003 | Kyuuma et al. |
| 6,663,027 B2 | 12/2003 | Jameson et al. |
| 6,668,630 B1 | 12/2003 | Kuglin et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Takeuchi et al. |
| 6,722,339 B2 | 4/2004 | Elliott |
| 6,722,340 B1 | 4/2004 | Sukegawa et al. |
| 6,722,840 B2 | 4/2004 | Fujisawa et al. |
| 6,725,826 B2 | 4/2004 | Esteghlal |
| 6,745,744 B2 | 6/2004 | Suckewer et al. |
| 6,748,918 B2 | 6/2004 | Rieger et al. |
| 6,749,043 B2 | 6/2004 | Brown et al. |
| 6,755,175 B1 | 6/2004 | McKay et al. |
| 6,756,140 B1 | 6/2004 | McAlister |
| 6,763,811 B1 | 7/2004 | Tamol, Sr. |
| 6,776,352 B2 | 8/2004 | Jameson |
| 6,779,513 B2 | 8/2004 | Pellizzari et al. |
| 6,796,516 B2 | 9/2004 | Maier et al. |
| 6,799,513 B2 | 10/2004 | Schäfer |
| 6,802,894 B2 | 10/2004 | Brodkin et al. |
| 6,811,103 B2 | 11/2004 | Gürich et al. |
| 6,814,313 B2 | 11/2004 | Petrone et al. |
| 6,824,084 B2 * | 11/2004 | Maier et al. ................ 239/585.1 |
| 6,832,472 B2 | 12/2004 | Huang et al. |
| 6,832,588 B2 | 12/2004 | Herden et al. |
| 6,845,920 B2 | 1/2005 | Sato et al. |
| 6,851,413 B1 | 2/2005 | Tamol, Sr. |
| 6,854,438 B2 | 2/2005 | Hilger et al. |
| 6,871,630 B2 | 3/2005 | Herden et al. |
| 6,883,490 B2 | 4/2005 | Jayne |
| 6,892,971 B2 | 5/2005 | Rieger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,925,983 B2 | 8/2005 | Herden et al. |
| 6,940,213 B1 | 9/2005 | Heinz et al. |
| 6,954,074 B2 | 10/2005 | Zhu et al. |
| 6,955,154 B1 | 10/2005 | Douglas |
| 6,959,693 B2 | 11/2005 | Oda |
| 6,976,683 B2 | 12/2005 | Eckert et al. |
| 6,984,305 B2 | 1/2006 | McAlister |
| 6,993,960 B2 | 2/2006 | Benson |
| 6,994,073 B2 | 2/2006 | Tozzi et al. |
| 7,007,658 B1 | 3/2006 | Cherry et al. |
| 7,007,661 B2 | 3/2006 | Warlick |
| 7,013,863 B2 | 3/2006 | Shiraishi et al. |
| 7,025,358 B2 | 4/2006 | Ueta et al. |
| 7,032,845 B2 | 4/2006 | Dantes et al. |
| 7,070,126 B2 | 7/2006 | Shinogle |
| 7,073,480 B2 | 7/2006 | Shiraishi et al. |
| 7,077,100 B2 | 7/2006 | Vogel et al. |
| 7,077,108 B2 | 7/2006 | Fujita et al. |
| 7,077,379 B1 | 7/2006 | Taylor |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,137,382 B2 | 11/2006 | Zhu et al. |
| 7,138,046 B2 | 11/2006 | Roychowdhury |
| 7,140,347 B2 | 11/2006 | Suzuki et al. |
| 7,140,353 B1 | 11/2006 | Rauznitz et al. |
| 7,140,562 B2 | 11/2006 | Holzgrefe et al. |
| 7,198,208 B2 | 4/2007 | Dye et al. |
| 7,201,136 B2 | 4/2007 | McKay et al. |
| 7,204,133 B2 | 4/2007 | Benson et al. |
| 7,214,883 B2 | 5/2007 | Leyendecker |
| 7,228,840 B2 | 6/2007 | Sukegawa et al. |
| 7,249,578 B2 | 7/2007 | Fricke et al. |
| 7,255,290 B2 | 8/2007 | Bright et al. |
| 7,272,487 B2 | 9/2007 | Christen et al. |
| 7,278,392 B2 | 10/2007 | Zillmer et al. |
| 7,305,971 B2 | 12/2007 | Fujii |
| 7,309,029 B2 | 12/2007 | Boecking |
| 7,340,118 B2 | 3/2008 | Wlodarczyk et al. |
| 7,367,319 B2 | 5/2008 | Kuo et al. |
| 7,386,982 B2 | 6/2008 | Runkle et al. |
| 7,404,395 B2 | 7/2008 | Yoshimoto |
| 7,409,929 B2 | 8/2008 | Miyahara et al. |
| 7,418,940 B1 | 9/2008 | Yi et al. |
| 7,422,166 B2 * | 9/2008 | Hoffmann et al. ......... 239/585.2 |
| 7,481,043 B2 | 1/2009 | Hirata et al. |
| 7,484,369 B2 | 2/2009 | Myhre |
| 7,513,222 B2 | 4/2009 | Orlosky |
| 7,527,041 B2 | 5/2009 | Wing et al. |
| 7,540,271 B2 | 6/2009 | Stewart et al. |
| 7,554,250 B2 | 6/2009 | Kadotani et al. |
| 7,588,012 B2 | 9/2009 | Gibson et al. |
| 7,625,531 B1 | 12/2009 | Coates et al. |
| 7,626,315 B2 | 12/2009 | Nagase |
| 7,628,137 B1 | 12/2009 | McAlister |
| 7,650,873 B2 | 1/2010 | Hofbauer et al. |
| 7,703,775 B2 | 4/2010 | Matsushita et al. |
| 7,707,832 B2 | 5/2010 | Commaret et al. |
| 7,714,483 B2 | 5/2010 | Hess et al. |
| 7,728,489 B2 | 6/2010 | Heinz et al. |
| 7,849,833 B2 | 12/2010 | Toyoda |
| 7,880,193 B2 | 2/2011 | Lam |
| 7,886,993 B2 * | 2/2011 | Bachmaier et al. ........ 239/102.2 |
| 7,898,258 B2 | 3/2011 | Neuberth et al. |
| 7,918,212 B2 | 4/2011 | Verdejo et al. |
| 7,938,102 B2 | 5/2011 | Sherry |
| 7,942,136 B2 | 5/2011 | Lepsch et al. |
| 8,069,836 B2 | 12/2011 | Ehresman |
| 8,091,528 B2 | 1/2012 | Mcalister |
| 2002/0017573 A1 | 2/2002 | Sturman |

(56) References Cited

U.S. PATENT DOCUMENTS

| | | |
|---|---|---|
| 2002/0070287 A1 | 6/2002 | Jameson et al. |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131686 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2002/0166536 A1 | 11/2002 | Hitomi et al. |
| 2003/0012985 A1 | 1/2003 | McAlister |
| 2003/0042325 A1* | 3/2003 | D'Arrigo ............... 239/102.2 |
| 2003/0047626 A1* | 3/2003 | Maier et al. ............. 239/585.5 |
| 2003/0102386 A1* | 6/2003 | Sebastian et al. ........ 239/533.2 |
| 2003/0127531 A1 | 7/2003 | Hohl |
| 2004/0008989 A1 | 1/2004 | Hung |
| 2004/0075000 A1* | 4/2004 | Ruehle et al. ........... 239/585.1 |
| 2004/0164175 A1* | 8/2004 | Maeurer et al. ......... 239/102.2 |
| 2004/0256495 A1 | 12/2004 | Baker et al. |
| 2005/0017096 A1* | 1/2005 | Bachmaier et al. .......... 239/584 |
| 2005/0045146 A1 | 3/2005 | McKay et al. |
| 2005/0098663 A1 | 5/2005 | Ishii |
| 2005/0255011 A1 | 11/2005 | Greathouse et al. |
| 2005/0257776 A1 | 11/2005 | Bonutti |
| 2006/0005738 A1 | 1/2006 | Kumar |
| 2006/0005739 A1 | 1/2006 | Kumar |
| 2006/0016916 A1 | 1/2006 | Petrone et al. |
| 2006/0037563 A1 | 2/2006 | Raab et al. |
| 2006/0102140 A1 | 5/2006 | Sukegawa et al. |
| 2006/0108452 A1 | 5/2006 | Anzinger et al. |
| 2006/0169244 A1 | 8/2006 | Allen |
| 2007/0142204 A1 | 6/2007 | Park et al. |
| 2007/0189114 A1 | 8/2007 | Reiner et al. |
| 2007/0283927 A1 | 12/2007 | Fukumoto et al. |
| 2008/0035116 A1* | 2/2008 | Scheffel et al. .............. 123/476 |
| 2008/0072871 A1 | 3/2008 | Vogel et al. |
| 2008/0081120 A1 | 4/2008 | Van Ooij et al. |
| 2008/0098984 A1 | 5/2008 | Sakamaki |
| 2008/0103672 A1 | 5/2008 | Ueda et al. |
| 2009/0078798 A1 | 3/2009 | Gruendl et al. |
| 2009/0093951 A1 | 4/2009 | McKay et al. |
| 2009/0204306 A1 | 8/2009 | Goeke et al. |
| 2009/0264574 A1 | 10/2009 | Van Ooij et al. |
| 2010/0020518 A1 | 1/2010 | Bustamante |
| 2010/0043758 A1 | 2/2010 | Caley |
| 2010/0077986 A1 | 4/2010 | Chen |
| 2010/0108023 A1 | 5/2010 | Mcalister |
| 2010/0183993 A1 | 7/2010 | Mcalister |
| 2011/0042476 A1 | 2/2011 | Mcalister |
| 2011/0048371 A1 | 3/2011 | Mcalister |
| 2011/0048374 A1 | 3/2011 | Mcalister |
| 2011/0048381 A1 | 3/2011 | Mcalister |
| 2011/0056458 A1 | 3/2011 | Mcalister |
| 2011/0057058 A1 | 3/2011 | Mcalister |
| 2011/0132319 A1 | 6/2011 | Mcalister |
| 2011/0134049 A1 | 6/2011 | Lin et al. |
| 2011/0146619 A1 | 6/2011 | Mcalister |
| 2011/0210182 A1 | 9/2011 | Mcalister |
| 2011/0233308 A1 | 9/2011 | Mcalister |
| 2011/0253104 A1 | 10/2011 | Mcalister |
| 2011/0297753 A1 | 12/2011 | Mcalister et al. |

FOREIGN PATENT DOCUMENTS

| | | |
|---|---|---|
| DE | 102005060139 | 6/2007 |
| EP | 392594 | 10/1990 |
| EP | 671555 | 9/1995 |
| EP | 1972606 A1 | 9/2008 |
| GB | 1038490 A | 8/1966 |
| JP | 61-023862 | 2/1986 |
| JP | 02-259268 | 10/1990 |
| JP | 08-049623 | 2/1996 |
| JP | 2008-334077 | 12/1996 |
| JP | 2004-324613 A | 11/2004 |
| KR | 2007-0026296 A | 3/2007 |
| KR | 2008-0073635 A | 8/2008 |
| WO | WO-2008-017576 | 2/2008 |

OTHER PUBLICATIONS

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." NASA Technical Memorandum (NASA TM-73833). Lewis Research Center. Nov. 1977. pp. 1-15.

Britt, Robert Roy. "Powerful Solar Storm Could Shut Down U.S. For Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Hodgin. Rick. "NASA Studies Solar Flare Dangers to Earth-based Technology." TG Daily. Published: Jan. 6, 2009. Accessed: May 17, 2011. <http://www.tgdaily.comitrendwatch/40830-nasa-studies-solar-flare-dangers-to-earth-based-technology>. pp. 1-2.

InfraTec GmbH. "Evaluation Kit for FPI Detectors | Datasheet—Detector Accessory." 2009. pp. 1-2.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002076; Applicant: McAlister Technologies, LLC.; Date of Mailing: Apr. 29, 2011 (8 pages).

International Search Report and Written Opinion for Application No. PCT/US2010/002077; Applicant: McAlister Technologies, LLC.; Date of Mailing: Apr. 29, 2011 (8 pages).

International Search Report and Written Opinion for Application No. PCT/US2010/002078; Applicant: McAlister Technologies, LLC.; Date of Mailing: Dec. 17, 2010 (9 pages).

International Search Report and Written Opinion for Application No. PCT/US2010/042812; Applicant: McAlister Technologies, LLC.; Date of Mailing: May 13, 2011 (9 pages).

International Search Report and Written Opinion for Application No. PCT/US2010/042815; Applicant: McAlister Technologies, LLC.; Date of Mailing: Apr. 29, 2011 (10 pages).

International Search Report and Written Opinion for Application No. PCT/US2010/042817; Applicant: McAlister Technologies, LLC.; Date of Mailing: Apr. 29, 2011 (8 pages).

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Non-Final Office Action for U.S. Appl. No. 12/006,774; Applicant: McAlister Technologies, LLC; Date of Mailing: Jan. 30, 2009, 18 pages.

(56) References Cited

OTHER PUBLICATIONS

Non-Final Office Action for U.S. Appl. No. 12/581,825; Applicant: McAlister Technologies, LLC; Date of Mailing: Mar. 25, 2011 (15 pages).

Non-Final Office Action for U.S. Appl. No. 12/804,510; Applicant: McAlister Technologies, LLC; Date of Mailing: Mar. 1, 2011 (10 pages).

Non-Final Office Action for U.S. Appl. No. 12/961,453; Applicant: McAlister Technologies, LLC; Date of Mailing: Jun. 9, 2011 (4 pages).

Notice of Allowance for U.S. Appl. No. 12/006,774; Applicant: McAlister Technologies, LLC; Date of Mailing: Jul. 27, 2009, 20 pages.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2010/054361; Applicant: McAlister Technologies, LLC.; Date of Mailing: Jun. 30, 2011, 9 pages.

International Search Report and Written Opinion for Application No. PCT/US2010/054364; Applicant: McAlister Technologies, LLC.; Date of Mailing: Aug. 22, 2011, 8 pages.

International Search Report and Written Opinion for Application No. PCT/US2010/059146; Applicant: McAlister Technologies, LLC.; Date of Mailing: Aug. 31, 2011, 11 pages.

International Search Report and Written Opinion for Application No. PCT/US2010/059147; Applicant: McAlister Technologies, LLC.; Date of Mailing: Aug. 31, 2011, 11 pages.

Non-Final Office Action for U.S. Appl. No. 13/027,051; Applicant: McAlister Technologies, LLC; Date of Mailing: Sep. 1, 2011, 7 pages.

Non-Final Office Action for U.S. Appl. No. 13/141,062; Applicant: McAlister Technologies, LLC; Date of Mailing: Aug. 11, 2011, 12 pages.

Non-Final Office Action for U.S. Appl. No. 12/961,461; Applicant: McAlister et al.; Date of Mailing: Jan. 17, 2012, 39 pages.

Final Office Action for U.S. Appl. No. 13/027,051; Applicant: McAlister Technologies, LLC; Date of Mailing: Oct. 20, 2011, 10 pages.

International Search Report and Written Opinion for Application No. PCT/US20111024778 Applicant: McAlister Technologies, LLC,; Date of Mailing: Sep. 27, 2011 (10 pages).

* cited by examiner

METHOD AND SYSTEM OF THERMOCHEMICAL REGENERATION TO PROVIDE OXYGENATED FUEL, FOR EXAMPLE, WITH FUEL-COOLED FUEL INJECTORS

CROSS-REFERENCE TO RELATED APPLICATION(S)

The present application claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237,479, filed Aug. 27, 2009 and titled FULL SPECTRUM ENERGY; U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. The present application is a continuation-in-part of PCT Application No. PCT/US09/67044, filed Dec. 7, 2009 and titled INTEGRATED FUEL INJECTORS AND IGNITERS AND ASSOCIATED METHODS OF USE AND MANUFACTURE. The present application is a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; which is a continuation-in-part of U.S. patent application Ser. No. 12/006,774 (now U.S. Pat. No. 7,628,137), filed Jan. 7, 2008 and titled MULTIFUEL STORAGE, METERING, AND IGNITION SYSTEM; and which claims priority to and the benefit of U.S. Provisional Application No. 61/237,466, filed Aug. 27, 2009 and titled MULTIFUEL MULTIBURST. The present application is a continuation-in-part of U.S. patent application Ser. No. 12/581,825, filed Oct. 19, 2009 and titled MULTIFUEL STORAGE, METERING, AND IGNITION SYSTEM; which is a divisional of U.S. patent application Ser. No. 12/006,774 (now U.S. Pat. No. 7,628,137), filed Jan. 7, 2008 and titled MULTIFUEL STORAGE, METERING, AND IGNITION SYSTEM. Each of these applications is incorporated herein by reference in its entirety.

TECHNICAL FIELD

The following disclosure relates generally to integrated fuel injectors and igniters and associated components for directly injecting and igniting various fuels in a combustion chamber using thermochemical regeneration and more specifically, using fuel to cool the injector assembly during operation.

BACKGROUND

Fuel injection systems are typically used to inject a fuel spray into an inlet manifold or a combustion chamber of an engine. Fuel injection systems have become the primary fuel delivery system used in automotive engines, having almost completely replaced carburetors since the late 1980s. Fuel injectors used in these fuel injection systems are generally capable of two basic functions. First, they deliver a metered amount of fuel for each inlet stroke of the engine so that a suitable air-fuel ratio can be maintained for the fuel combustion. Second they disperse the fuel to improve the efficiency of the combustion process. Conventional fuel injection systems are typically connected to a pressurized fuel supply, and the fuel can be metered into the combustion chamber by varying the time for which the injectors are open. The fuel can also be dispersed into the combustion chamber by forcing the fuel through a small orifice in the injectors.

DETAILED DESCRIPTION

The present application incorporates by reference in their entirety the subject matter of each of the following U.S. patent applications, filed concurrently herewith on Jul. 21, 2010 and titled: INTEGRATED FUEL INJECTORS AND IGNITERS AND ASSOCIATED METHODS OF USE AND MANUFACTURE Ser. No. 12/841,170; FUEL INJECTOR ACTUATOR ASSEMBLIES AND ASSOCIATED METHODS OF USE AND MANUFACTURE Ser. No. 12/804,501; INTEGRATED FUEL INJECTORS AND IGNITERS WITH CONDUCTIVE CABLE ASSEMBLIES Ser. No. 12/841,146; SHAPING A FUEL CHARGE IN A COMBUSTION CHAMBER WITH MULTIPLE DRIVERS AND/OR IONIZATION CONTROL Ser. No. 12/841,149; CERAMIC INSULATOR AND METHODS OF USE AND MANUFACTURE THEREOF Ser. No. 12/841,135; and METHODS AND SYSTEMS FOR REDUCING THE FORMATION OF OXIDES OF NITROGEN DURING COMBUSTION IN ENGINES Ser. No. 12/804,508.

Overview

Figure 1A:
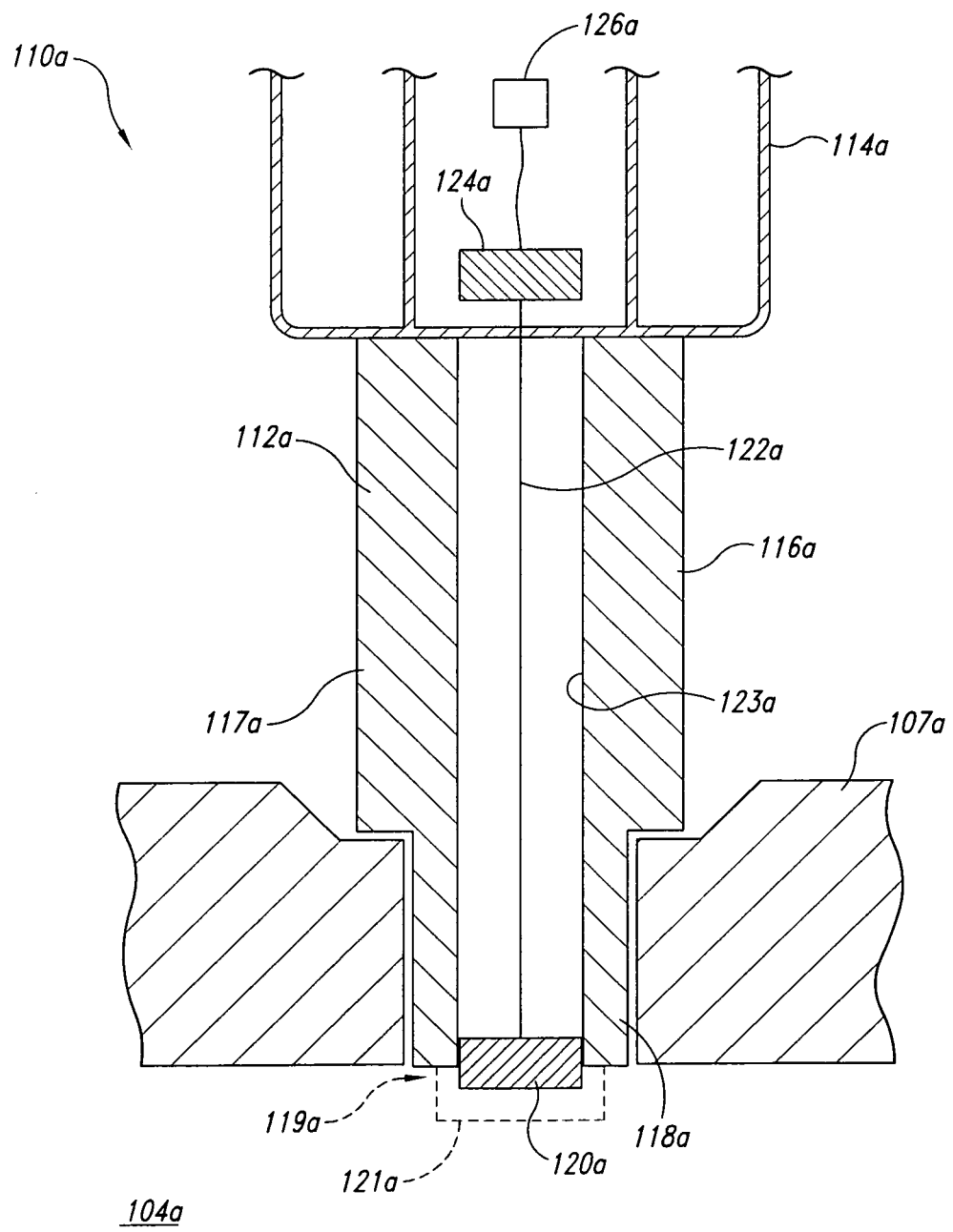
FIG. 1A is a schematic cross-sectional side view of an injector configured in accordance with an embodiment of the disclosure.

FIG. 1A is a schematic cross-sectional side view of an integrated injector/igniter 110a ("injector 110a") configured in accordance with an embodiment of the disclosure. The injector 110a illustrated in FIG. 1A is configured to inject different fuels into a combustion chamber 104a and to be controlled to adaptively adjust the pattern and/or frequency of the fuel injections or bursts based on combustion properties and conditions in the combustion chamber 104a. As explained in detail below, the injector 110a and other injectors described herein can optimize the injected fuel for rapid ignition and complete combustion. In addition to injecting the fuel, the injector 110a includes one or more integrated ignition features that are configured to ignite the injected fuel. As such, the injector 110a can be utilized to convert conventional internal combustion engines to be able to operate on multiple different fuels. Although several of the features of the illustrated injector 110a are shown schematically for purposes of illustration, several of these schematically illustrated features are described in detail below with reference to various features of embodiments of the disclosure. Accordingly, the relative location, position, size, orientation, etc. of the schematically illustrated components of the injector in FIG. 1A are not intended to limit the present disclosure.

In the illustrated embodiment, the injector 110a includes a casing or body 112a having a middle portion 116a extending between a base portion 114a and a nozzle portion 118a. The nozzle portion 118a extends at least partially through a port in an engine head 107a to position an end portion 119a of the nozzle portion 118a at the interface with the combustion chamber 104a. The injector 110a further includes a fuel passage or channel 123a extending through the body 112a from the base portion 114a to the nozzle portion 118a. The channel 123a is configured to allow fuel to flow through the body 112a. The channel 123a is also configured to allow other components, such as an actuator 122a, to pass through the body 112a, as well as instrumentation components and/or energy source components of the injector 110a. In certain embodiments, the actuator 122a can be a cable or rod that has a first end portion that is operatively coupled to a flow control device or valve 120a carried by the end portion 119a of the nozzle portion 118a. The actuator 122a can be integral with the valve 120a or a separate component that is attached to the valve 120a. As such, the flow valve 120a is positioned proximate to the interface with the combustion chamber 104a. Although not shown in FIG. 1A, in certain embodiments the injector 110a can include more than one flow valve, as well as one or more check valves positioned proximate to the combustion chamber 104a, as well as at other locations on the body 112a.

According to another feature of the illustrated embodiment, the actuator 122a also includes a second end portion operatively coupled to a plunger or driver 124a. The second end portion can further be coupled to a controller or processor 126a. The controller or processor 126a can be positioned on the injector 110a or remotely from the injector 110a. As explained in detail below with reference to various embodiments of the disclosure, the controller 126a and/or the driver 124a are configured to rapidly and precisely actuate the actuator 122a to inject fuel into the combustion chamber 104a via the flow valve 120a. For example, in certain embodiments, the flow valve 120a can move outwardly (e.g., toward the combustion chamber 104a) and in other embodiments the flow valve 120a can move inwardly (e.g., away from the combustion chamber 104a) to meter and control injection of the fuel. Moreover, in certain embodiments, the driver 124a can tension the actuator 122a to retain the flow valve 120a in a closed or seated position, and the driver 124a can relax or relieve the tension in the actuator 122a to allow the flow valve 120a to inject fuel, and vice versa. The driver 124a can be responsive to the controller 126a as well as other force-inducing components (e.g., acoustic, electromagnetic and/or piezoelectric components) to achieve the desired frequency and pattern of the injected fuel bursts.

In certain embodiments, the actuator 122a can include one or more integrated sensing and/or transmitting components to detect combustion chamber properties and conditions. For example, the actuator 122a can be formed from fiber optic cables, insulated transducers integrated within a rod or cable, or can include other sensors to detect and communicate combustion chamber data. Although not shown in FIG. 1A, in other embodiments, and as described in detail below, the injector 110a can include other sensors or monitoring instrumentation located at various positions on the injector 110a. For example, the body 112a can include optical fibers integrated into the material of the body 112a, or the material of the body 112a itself can be used to communicate combustion data to one or more controllers. In addition, the flow valve 120a can be configured to sense or carry sensors in order to transmit combustion data to one or more controllers associated with the injector 110a. This data can be transmitted via wireless, wired, optical or other transmission mediums to the controller 126a or other components. Such feedback enables extremely rapid and adaptive adjustments for optimization of fuel injection factors and characteristics including, for example, fuel delivery pressure, fuel injection initiation timing, fuel injection durations for production of multiple layered or stratified charges, the timing of one, multiple or continuous plasma ignitions or capacitive discharges, etc.

Such feedback and adaptive adjustment by the controller 126a, driver 124a, and/or actuator 126a also allows optimization of outcomes such as power production, fuel economy, and minimization or elimination of pollutive emissions including oxides of nitrogen. U.S. Patent Application Publication No. 2006/0238068, which is incorporated herein by reference in its entirety, describes suitable drivers for actuating ultrasonic transducers in the injector 110a and other injectors described herein.

The injector 110a can also optionally include an ignition and flow adjusting device or cover 121a (shown in broken lines in FIG. 1A) carried by the end portion 119a adjacent to the engine head 107a. The cover 121a at least partially encloses or surrounds the flow valve 120a. The cover 121a may also be configured to protect certain components of the injector 110a, such as sensors or other monitoring components. The cover 121a can also act as a catalyst, catalyst carrier and/or first electrode for ignition of the injected fuels. Moreover, the cover 121a can be configured to affect the shape, pattern, and/or phase of the injected fuel: The flow valve 120a can also be configured to affect these properties of the injected fuel. For example, in certain embodiments the cover 121a and/or the flow valve 120a can be configured to create sudden gasification of the fuel flowing past these components. More specifically, the cover 121a and/or the flow valve 120a can include surfaces having sharp edges, catalysts, or other features that produce gas or vapor from the rapidly entering liquid fuel or mixture of liquid and solid fuel. The acceleration and/or frequency of the flow valve 120a actuation can also suddenly gasify the injected fuel. In operation, this sudden gasification causes the vapor or gas emitted from the nozzle portion 118a to more rapidly and completely combust. Moreover, this sudden gasification may be used in various combinations with super heating liquid fuels and plasma or acoustical impetus of projected fuel bursts. In still further embodiments, the frequency of the flow valve 120a actuation can induce plasma projection to beneficially affect the shape and/or pattern of the injected fuel. U.S. Pat. No. 4,122,816, which is incorporated herein by reference in its entirety, describes suitable drivers for actuating plasma projection by injector 110a and other injectors described herein.

According to another aspect of the illustrated embodiment, and as described in detail below, at least a portion of the body 112a is made from one or more dielectric materials 117a suitable to enable the high energy ignition to combust different fuels, including unrefined fuels or low energy density fuels. These dielectric materials 117a can provide sufficient electrical insulation of the high voltage for the production, isolation, and/or delivery of spark or plasma for ignition. In certain embodiments, the body 112a can be made from a single dielectric material 117a. In other embodiments, however, the body 112a can include two or more dielectric materials. For example, at least a segment of the middle portion 116a can be made from a first dielectric material having a first dielectric strength, and at least a segment of the nozzle portion 118a can be made from a dielectric material having a second dielectric strength that is greater than the first dielectric strength. With a relatively strong second dielectric strength, the second dielectric can protect the injector 110a from thermal and mechanical shock, fouling, voltage tracking, etc. Examples of suitable dielectric materials, as well as the locations of these materials on the body 112a, are described in detail below.

In addition to the dielectric materials, the injector 110a can also be coupled to a power or high voltage source to generate the ignition event to combust the injected fuels. The first electrode can be coupled to the power source (e.g., a voltage generation source such as a capacitance discharge, induction, or piezoelectric system) via one or more conductors extending through the injector 110a. Regions of the nozzle portion 118a, the flow valve 120a, and/or the cover 121a can operate as a first electrode to generate an ignition event (e.g., spark, plasma, compression ignition operations, high energy capacitance discharge, extended induction sourced spark, and/or direct current or high frequency plasma, in conjunction with the application of ultrasound to quickly induce, impel, and complete combustion) with a corresponding second electrode of the engine head 107a. As explained in detail below, the first electrode can be configured for durability and long service life. In still further embodiments of the disclosure, the injector 110a can be configured to provide energy conversion from combustion chamber sources and/or to recover waste heat or energy via thermochemical regeneration to drive one or more components of the injector 110 from the energy sourced by the combustion events.

The features of the injector 110a described above with reference to FIG. 1A can be included in any of the embodiments described below with reference to FIGS. 1B-9.

Figure 1B:
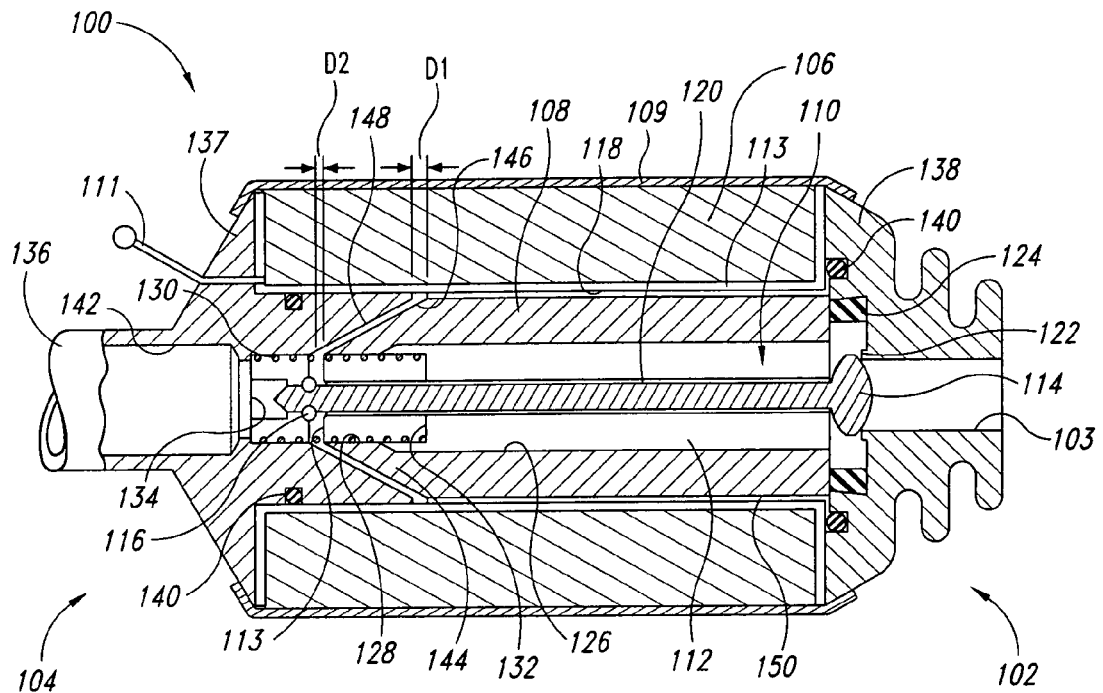
FIG. 1B is a cross-sectional side view of an injector configured in accordance with another embodiment of the disclosure.

Additional Embodiments of Integrated Fuel Injectors and Igniters and Associated Components FIG. 1B is a cross-sectional side view of an injector 100 configured in accordance with an embodiment of the disclosure that includes combined fuel injection and ignition features. As described in detail below, the illustrated embodiment of the injector 100 includes an electromagnetic actuator assembly and corresponding valve assembly that provide a rugged and versatile yet inexpensive assembly for precisely metering fuel to achieve the desired fuel flow characteristics. In the illustrated embodiment, the injector 100 includes several features that are generally similar in structure and function to the corresponding features of the injector 110a described above with reference to FIG. 1A. For example, the injector 100 includes a nozzle portion 102 opposite a base portion 104. The nozzle portion 102 is configured to at least partially extend through a port in an engine head to position the end of the nozzle portion 102 at an interface with a combustion chamber. As described in detail below, the base portion 104 is configured to receive one or more fuels from a fuel source (e.g., a pressurized fuel source), and the nozzle portion 102 is configured to deliver and/or precisely meter the fuel into the combustion chamber through a fuel exit passage 103.

In the illustrated embodiment, the injector 100 includes a force generator 106 that actuates a plunger or driver 108 to in turn move a valve assembly 110. The force generator 106 is positioned within a bobbin or housing 109, such as a conductive metallic casing. Suitable materials for the force generator bobbin or housing 109 include, for example, beryllia and various graphite, silver, and/or aluminum filled polymers that are designed to enhance heat transfer. The force generator 108 and/or the housing 109 can also be coupled to voltage source or other suitable energy source 111, as well as a controller. In certain embodiments, the force generator 106 can be solenoid winding that is an electromagnetic force generator, a piezoelectric force generator, or other suitable type of force generator for moving the driver 108.

In accordance with aspects of this disclosure, the solenoid winding may be incorporated in a circuit to serve as an electromagnet for operation of armature and valve actuation and additionally as a transformer such as a pulse transformer, transformer with multiple windings, or autotransformer for generating spark or plasma discharges at the interface to the combustion chamber. In other instances it is desired to provide a solenoid winding comprising multiple insulated conductors for the purpose of increasing the number of turns and current magnitude for greater magnetic circuit strength when energized and to thus develop increased magnetic force and decrease the pull-in time for rapid operation of an actuator. Various materials such as polyimide, polyetherimide, parylene, various modified chemical vapor deposited poly (p-xylene) films, glass ceramics, including micro and nano particles including the dielectric systems disclosed in copending US patent application Entitled "Integrated Fuel Injectors and Igniters and Associated Methods of Use and Manufacture," U.S. patent application Ser. No. 12/653,085 (the '085 application), are used to insulate the conductor windings and enable voltage transformation whereby the multiple windings are energized for very rapid pull in, and at least one winding portion is then switched to serve as the secondary of a transformer circuit to provide the turns ratio and induction desired for the spark or plasma developed at the combustion chamber interface for ignition.

The valve assembly 110 includes an actuator 112 (e.g., a cable, stiffened cable, rod, valve extension, etc.) having a flow valve 114 at the nozzle portion 102, and an actuator stop 116 at the base portion 104 opposite the nozzle portion 102. In certain embodiments, the flow valve 114 can be integrally formed with the actuator 112. In other embodiments, however, the flow valve 114 can be separate from and attached to the actuator 112. Moreover, in certain embodiments the stop 116 can be a wire, such as a constrictive spring wire, that is attached to the second end portion of the actuator 112. For example, the stop 116 can be at least partially embedded in an annular groove in the actuator 112, the annular groove having a depth of at least approximately 50% of the diameter of the motion stop 116. In other embodiments, however, the stop 116 and other actuator stops disclosed herein can be any other type of protrusion on the actuator 112 that is attached to or integrally formed with the actuator 112. The stop 116 is positioned on the actuator 112 to contact a contact surface 113 of the driver 108 when the force generator 106 actuates the driver 108 to move the actuator 112 and consequently open the flow valve 114.

In the closed position the flow valve 114 rests against a valve seat 122 in the nozzle portion 102. In certain embodiments, the surface of the flow valve 114 that contacts the valve seat 122 can be a generally spherical or conical surface that is fine finished or polished for sealing against the valve seat 122. The nozzle portion 102 can also include a biasing or attractive element 124, such as a magnet, permanent magnet, etc., that attracts the driver 108 towards the nozzle portion 102 to at least partially retain the valve 114 in the closed position against the valve seat 122. For example, the attractive element 124 can be coupled to a controller or computer and selectively attract the driver 108 towards the nozzle portion 102. In other embodiments, actuation of the driver 108 can overcome the attractive force of the attractive element 124. As described in detail below, the valve 114 can also be retained in the closed position with other biasing components and/or fuel pressure within the injectors 100.

The driver 108 is positioned in a driver cavity 118 in the injector 100 to allow the driver 108 to move longitudinally through the injector 100 in response to excitation from the force generator 106. Moreover, the actuator 112 is positioned in an actuator cavity or opening 120 extending longitudinally through the driver 108. The actuator opening 120 thereby allows the driver 108 to move longitudinally in the injector 100 with reference to the actuator 112 until the driver 108 contacts the actuator stop 116. In the illustrated embodiment, the driver 108 also includes a fuel cavity 126 extending longitudinally therethrough and spaced radially apart from the actuator opening 120. The fuel cavity 126 is fluidly coupled to a fuel passageway or channel 128 in the base portion 104. The fuel channel 128 is also coupled to a fuel conduit 136, which is in turn coupled to a fuel source, such as a pressurized fuel source. In certain embodiments, the fuel conduit 136 can include a fuel filter 142 configured to filter or otherwise condition the fuel prior to entering the body of the injector 100.

In the illustrated embodiment, the base portion 102 also includes a biasing member 130 (e.g., a spring such as a coiled compression spring) positioned in the fuel channel 128. The biasing member 130 contacts a first biasing surface 132 of the driver 108, as well as a second biasing surface 134 of the fuel channel 128. In this manner, the biasing member 130 urges the driver 108 towards the nozzle portion 102 to retain the actuator 112 and corresponding flow valve 114 in the closed position.

The force generator housing 109 is coupled to a first end cap 137 at the base portion 104, and a second end cap 138 at the nozzle portion 102. The housing 109 can be attached (e.g., hermetically sealed via soldering, brazing, welding, structurally adhesive sealing, etc.) to each of the first and second end caps 137, 138 to prevent fuel from escaping from the injector 100. Seals 140, such as o-rings, can also be used to maintain a fluid tight connection between the housing 109 and the first and second end caps 137, 138.

According to another aspect of the illustrated embodiment, an end portion 144 of the driver 108 in the base portion 104 has a generally conical or frustoconical shape. More specifically, the end portion 144 of the driver 108 has an outer end surface 146 that has a generally conical or frustoconical shape. The outer end surface 146 of the driver 108 is spaced apart from a corresponding contact surface 148 of the first end cap 137 having a matching contour or shape. When the flow valve 114 is in the closed position against the valve seat 122 and the driver 108 is in a relaxed or non-actuated state, the outer end surface 146 is spaced apart from the contact surface 148 of the end cap 137 by a first distance $D_1$. In addition, at this position the contact surface 113 of the driver 108 is spaced apart from the stop 116 on the actuator 112 by a second distance $D_2$. The second distance $D_2$ accordingly allows the driver 108 to gain momentum before striking the stop 116 of the actuator 112. For example, the first distance $D_1$ is the total distance that the driver 108 travels to move the flow valve 114 via the actuator 112 to open the flow valve 314. More specifically, first distance $D_1$ is at least approximately equal to the second distance $D_2$ plus the distance that the flow valve 114 moves to be sufficiently spaced apart from the valve seat 122 to inject the fuel into the combustion chamber. In one embodiment, the second distance $D_2$ can be between approximately 10% to 40% of the first distance $D_1$. In other embodiments, however, the second distance $D_2$ can be less than 10% or greater than 40% of first distance $D_1$. In still other embodiments, the second distance D2 can be eliminated from the injector 100 such that the driver 108 contacts the actuator stop 116 when the valve is in the closed position.

In operation, the fuel conduit 136 introduces fuel through the fuel filter 142 into the base portion 104 of the injector 100. As the fuel flows through the injector 100, a controller can precisely power the force generator 106 to actuate the driver 108, which in turn moves the actuator 112 to lift the flow valve 114 off of the valve seat 122 (i.e., to move the flow valve 114 inwardly). The actuated driver 108 can accordingly overcome the biasing force of the biasing member 130 and/or the attractive element 124 to move away from the nozzle portion 102. Moreover, the illustrated embodiment allows for operation of the flow valve 114 at relatively high pressure differentials by allowing the driver 108 to gain considerable momentum and associated kinetic energy while moving the second distance $D_2$ prior to impacting the actuator-stop 116 to move the valve 114. As such, the driver 108 can overcome a considerable pressure gradient to move the flow valve 114. In embodiments where the second distance $D_2$ is eliminated, the driver 108 can directly or instantly move the actuator 112 in response to current flow in the force generator 106.

Interruption of the current in the force generator 106 in response to the controller allows fuel flow and the resulting pressure, the biasing member 130, and/or the attractive element 124 to urge or force the driver 108 to the normally closed position, which in turn allows the flow valve 114 to return to the normally closed position. For example, a distal end portion of the driver 108 can contact or otherwise move the flow valve 114 to the closed position on the valve seat 122. Subsequent application of current to the force generator 106 can move the driver 108 to contact the actuator 112 and again move or lift the valve 114 off the valve seat 122 to inject fuel into the combustion chamber.

In addition to filtering particles and debris from the fuel, the filter 142 at the base portion 104 can also function as a catalytic processor for preventing any monatomic or ionic hydrogen from further passage into the injector 100, including into the fuel channel 128, which houses the biasing member 130. This purpose is supported by the finding that steel alloys do not become embrittled by diatomic hydrogen ($H_2$) even though exposure to monatomic hydrogen and ionic hydrogen, as may be encountered during welding operations, in acidic environments, and during metal plating operations, causes degradation and embrittlement of such alloys. Accordingly, the filter 142 can prevent the adverse degradation of the biasing member 130 by hydrogen embrittlement. Equations F1 and F2 below summarize the elimination of the hydrogen ions and atomic hydrogen by the catalytic action of the filter 142.

$$2H^+ + 2e^- \rightarrow H_2 \qquad \text{Equation F1}$$

$$2H \rightarrow H_2 \qquad \text{Equation F2}$$

In the process of Equation F1, electrons are supplied by grounding the injector 100 to an electron source via the metallic fuel conduit 136. Electrons may also be supplied for accomplishing the process of Equation F1 by grounding one end of force generator 106 to the conductive housing 109. Nucleation of diatomic hydrogen from monatomic hydrogen can be assured by various agents and compounds, including for example, oxides such as zinc oxide, tin oxide, chromia, alumina, and silica that may be incorporated in the filter 142 as fibers and/or particles including surfaces of substrates such as aluminum and/or aluminum-silicon alloys. Such fibers, particles, and/or other suitable forms made of metals and/or alloys such as aluminum, magnesium, or zinc can also serve as catalysts in the filter 142. Similarly chemical vapor deposition and/or sputtered deposits of these metals on various substrates, followed by partial oxidation, can be positioned in the filter 142 to provide catalytic processing as summarized by Equations F1 and F2. Fuels that provide oxidizing potential, such as "oxygenated" fuels that Contain water vapor, enable self-healing of such metal oxides. In embodiments where high strength alloy materials, such as music wire, spring steel, precipitation-hardened (PH) steel, or a chrome-silicon steel alloy, are selected for the biasing member 130, additional protection may also be provided by plating the biasing member 130 with protective metals such as aluminum. For example, the biasing member 130 can be plated with any suitable plating methods including, for example, hot dip, electrolytic, chemical vapor, and/or sputtering processes.

The injector 100 of the illustrated embodiment is also capable of dispensing very high pressure fuels, including hydrogen-characterized fuels that are produced as mixtures of methane from anaerobic digestion, thermal dissociation, or natural gas sources, as well as hydrogen produced by electrolysis, pyrolysis, or reformation of selected hydrocarbons. Such pressurized fuels, such as 10,000 psi hydrogen, methane, ammonia, or other hydrogen characterized mixtures can be supplied to the injector 100 and precisely metered by the injector 100 to achieve desired fuel bursts.

According to another feature of the illustrated embodiment, the driver 108 is proportioned as a relatively long component in the injector 100. More specifically, the longitudinal length of the driver 108 and the corresponding longitudinal length of the force generator 106 may be several times larger than the diameter of driver 108. This can allow or otherwise facilitate cooling of these components by fuel that is flowing through the injector 100. More specifically, the fuel flowing thought the injector 100 can cool the driver 108 and/or force generator 106. For example, as fuel flows along a fuel channel or passage 113 extending longitudinally along the injector 100, as well as through the driver 108 in the fuel bore or cavity 126, and/or around the driver 108 in a second fuel bore or passageway 150 in the driver cavity 118 generally surrounding the driver 108, the fuel can absorb heat from the driver 108. This is advantageous in many applications in modern overhead valve engines that virtually eliminate the opportunity to reject heat to the exterior surroundings of the injector because the temperature of the environment around and/or under the engine's valve cover generally approaches the operating limit of polymer compounds that insulate the magnet wire in the force generator 106.

Figure 2:
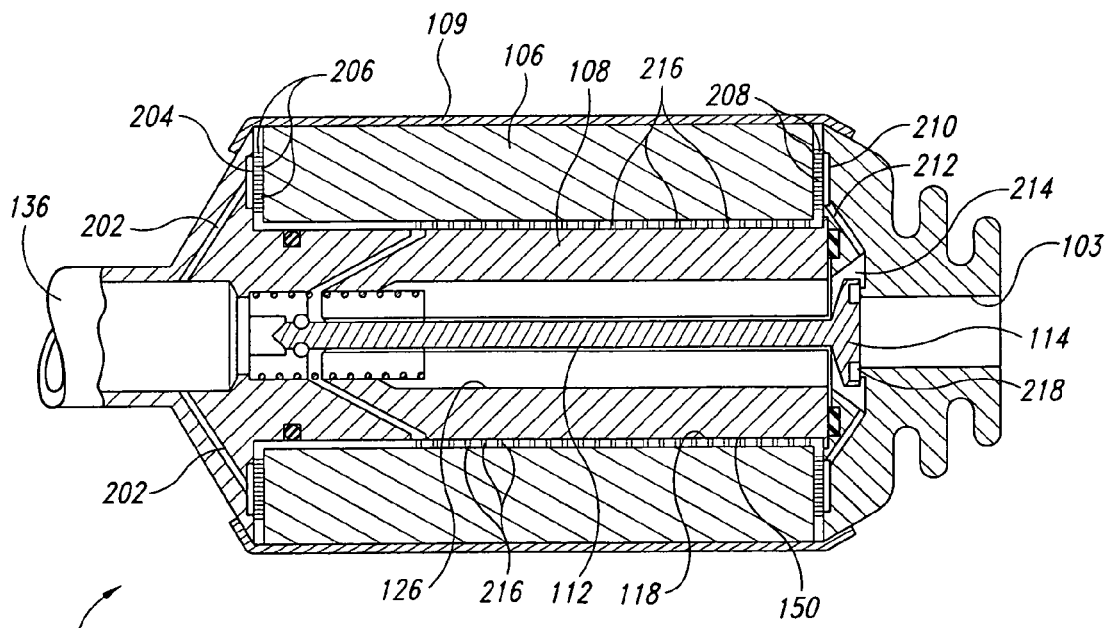
FIG. 2 is a cross-sectional side partial view of an injector configured in accordance with another embodiment of the disclosure.

FIG. 2 is a cross-sectional side partial view of an injector 200 configured in accordance with another embodiment of the disclosure. The injector 200 includes several features that are generally similar in structure and function to the corresponding features of the injector 100 illustrated in FIG. 1B and other injectors disclosed herein. For example, the injector 200 illustrated in FIG. 2 includes the fuel conduit 136, the force generator 106, the driver 108, and the corresponding actuator 112 and associated flow valve 114. The illustrated injector 200 also includes a biasing or attractive element 212 (e.g., a ring magnet or a permanent ring magnet) to attract or force the driver 108 to the normally closed position. The valve 114 can also include a seal 218, such as a ring-like elastomeric seal or o-ring, for applications in which bubble free sealing is desired at the valve 114 and when utilizing fuels that may precipitate or otherwise source solid particles.

In the illustrated embodiment, the injector 200 further includes several additional fuel flow paths or channels that direct the fuel through various components of the injector 200 to allow the fuel to contact surfaces of these components and cool or otherwise transfer heat from these components to the fuel. More specifically, for cooling the force generator 106 (which may include multiple solenoid windings) in the illustrated embodiment, the injector 200 includes a first fuel cooling passage 202 coupled between the fuel conduit 136 and an inlet distributor 204 (e.g., an annular or ring-like distributor) at the force generator 106. The inlet distributor 204 disperses the fuel into the housing 109 around the force generator 106 through multiple inlet vents 206. The injector 200 also includes multiple outlet vents 208 to allow the fuel to exit the force generator 106 and collect at an outlet distributor or collector 210 (e.g., an annular or ring-like distributor). A second fuel cooling passage 212 extends form the outlet distributor 210 to fuel channel 214. As the valve 114 opens, the fuel can exit the injector 200 by passing from the fuel channel 214 to the fuel exit passage 103.

According to another feature of the illustrated embodiment, the injector 200 also includes additional fuel passages 216 extending radially outwardly to allow the fuel to pass between the force generator 106 and the driver 108. For example, these fuel passages 216 fluidly couple the fuel bore 150 in the driver cavity 118 with the housing 109 encompassing the force generator 106. As such, during operation the fuel can also pass radially outwardly and/or radially inwardly to transfer heat from the components of the injector 200, such as the force generator 106 and the driver 108, for example.

In certain embodiments, such as four stroke engine applications, the period during which fuel injection occurs typically ranges from about 30° to 120° of every other crank rotation of a complete cycle (e.g., 720°). Longitudinal fuel cavities 126 and 113 (FIG. 1) can accordingly provide for rapid cooling of the driver 108, particularly during the period ranging from approximately 30° to 120° of the crank rotation. As such, the driver 108 can serve as an internal heat sink to receive heat rejected from solenoid coil or force generator 106. Additional heat can also be rejected from the force generator 106 to fuel circulating through the various fuel distributors and passageways 204, 206, 208, and 216. Accordingly, during the 690° to 720° period of crank rotation when driver 108 and valve 114 are in the normally closed position, the force generator 106 can be provided with superior heat rejection capabilities to assure efficient rapid action and long life.

Such heat transfer from the components of the injectors 100, 200 can be beneficially added to the fuel that is delivered to the combustion chamber instead of being lost to the environment. Similarly, energy harvesting by thermoelectric, photovoltaic, vibrational and pressure piezoelectric generators is facilitated by such heat transfer to fuel passing through these injector embodiments with such heat sinking capabilities. Such heat transfer is also beneficial for long life, minimization of friction, and rapid operation to adequately cool the force generator 106 and driver 108. Transferring heat to the fuel that flows through the force generator 106 components and related features allows low cost modular component assemblies including the force generator 106 to be incorporated within thermally insulating glass or polymers.

Figure 3A:
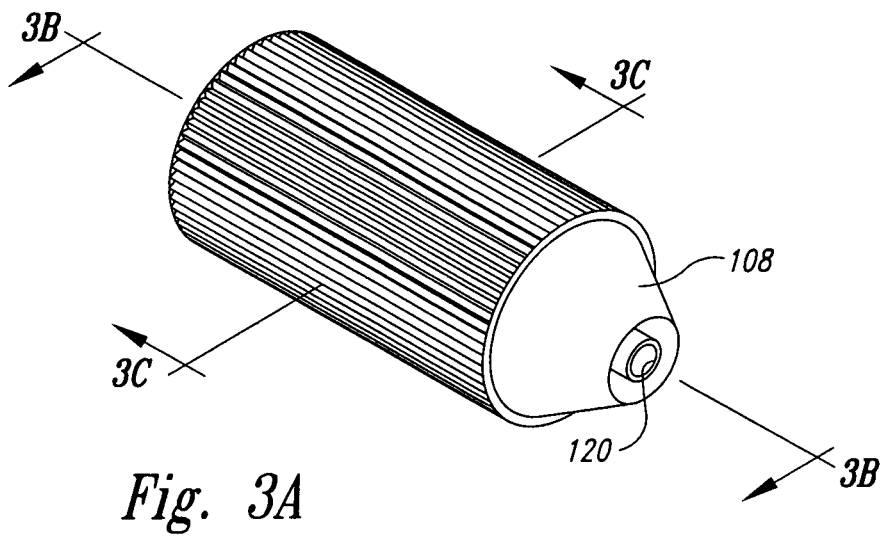
FIG. 3A is an isometric view of a component of the injector of FIGS. 1B and 2.
Figure 3B:
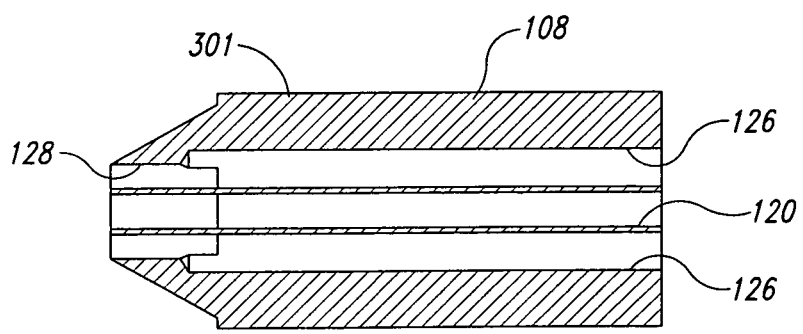
FIG. 3B is a cross-sectional side view taken substantially along the lines 3B-3B of FIG. 3A.
Figure 3C:
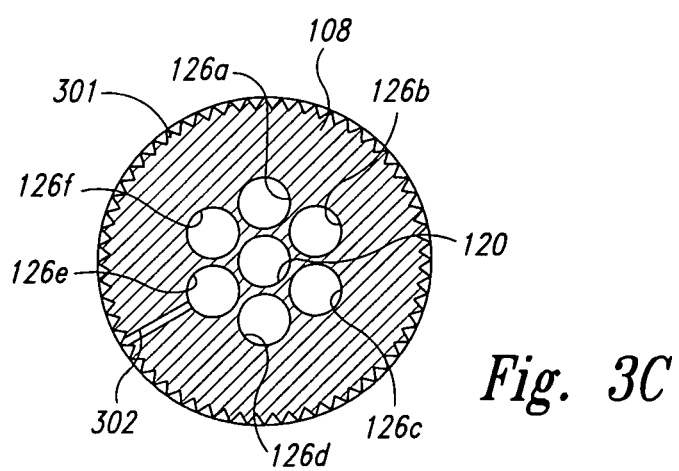
FIG. 3C is cross-sectional side view taken substantially along the lines 3C-3C of FIG. 3A.

FIG. 3A is an isometric view of the driver 108, FIG. 3B is a cross-sectional side view taken substantially along the lines 3B-3B of FIG. 3A, and FIG. 3C is cross-sectional side view taken substantially along the lines 3C-3C of FIG. 3A illustrating several of the features of the driver 108. Referring to FIGS. 3A-3C together, the driver 108 includes a body 301 with the actuator opening 120 extending centrally and longitudinally therethrough. The actuator opening 120 is configured to movably receive the actuator 112 of FIG. 1B. The body 301 also includes the initial fuel channel 128 that is fluidly coupled to one or more fuel cavities 126 (e.g., first-sixth fuel cavities 126a-126f illustrated in FIG. 3C) spaced radially apart from the actuator opening 120. The fuel cavities 126 extend longitudinally through the driver 108 to allow fuel to flow therethrough while contacting the body 301. Although the driver 108 includes six fuel cavities 126 that are symmetrically spaced apart in the illustrated embodiment, in other embodiments the driver can have more or less fuel cavities 126 that are positioned in symmetrical or nonsymmetrical distribution patterns. An exterior surface of the body 301 also includes multiple ridges 304 (FIG. 4C) to allow the fuel to flow around the driver 108 within the driver cavity 118 (FIG. 1B).

According to yet another feature of the illustrated embodiment, the body 301 of the driver 108 includes a slot or slit 302 extending radially outwardly from one of the fuel cavities 128. In certain embodiments, the slit 302 can be a generally straight slit or slot that extends radially outwardly from the actuator opening 120. In other embodiments, however, the slit 302 can have a generally curved or spiral shape. The slit 302 is configured to be a material discontinuity in at least a portion of the body 301 of the driver 108 to prevent eddy currents from forming in the driver 108 during operation. Such eddy currents can also be prevented by forming the driver 108 from a ferromagnetic alloy with a high electrical resistance.

Thermochemical Regeneration to Provide Oxygenated Fuel to Combustion Chamber

Figure 4:
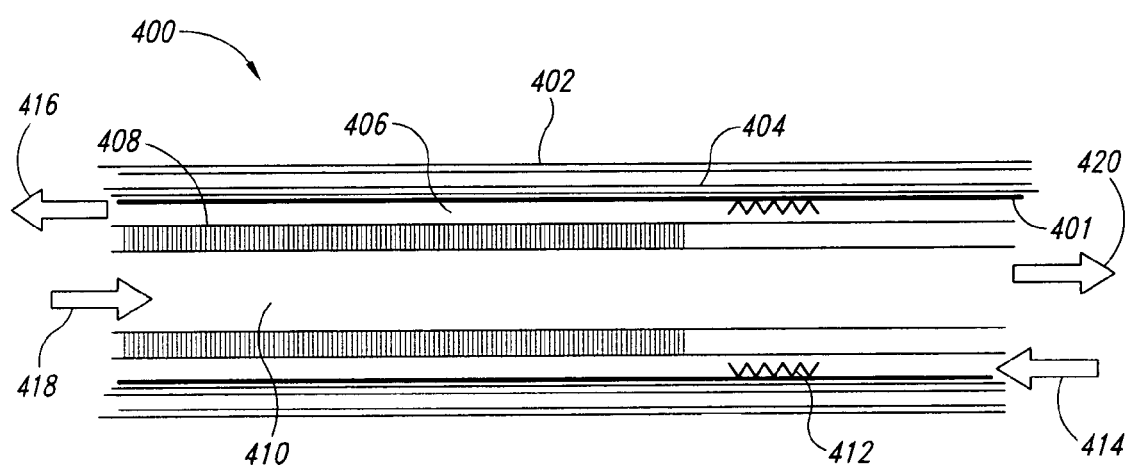
FIG. 4 is a cross-sectional view of an illustrative embodiment in accordance with the disclosure.

FIG. 4 illustrates a system for utilizing heat normally discarded from sources such as a heat engine to drive endothermic reactions that provide oxygenated fuel species. In addition to providing numerous significant advantages of an oxygenated fuel species, thermochemical regeneration provides 15% to 30% more fuel value along with hydrogen-characterized fuel combustion characteristics upon combustion compared to the original fuel that is selected for the processes disclosed in the following embodiments.

Hydrogen characterized combustion is seven to ten times faster than hydrocarbons such as methane and therefore enables much more torque to be developed per calorie or BTU of heat released than slower burning fuels that require much earlier ignition and thus cause heat loss and counter-torque losses during the compression period of engine operation.

Equation 501 summarizes the general process for hydrocarbons such as diesel fuel, gasoline, natural gas, propane, ethane, etc:

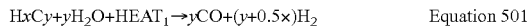

$$HxCy + yH_2O + HEAT_1 \rightarrow yCO + (y+0.5x)H_2 \qquad \text{Equation 501}$$

$$CH_4 + H_2O + HEAT_2 \rightarrow CO + 3H_2 \qquad \text{Equation 502}$$

Equation 502 summarizes the production of oxygenated carbon fuel as shown whereby methane is reacted with steam to produce carbon monoxide and hydrogen. In operation, heat that is normally rejected through a radiator is added to fuel in a counter current heat exchanger and additional heat is added by counter current heat exchange from the exhaust gases. Steam is transported from the products of combustion through capillaries 408 and presented at the surface of capillary body 408 for reaction such as shown in Equations 501 or 502. Concurrently filed and co-pending applications are incorporated by reference above; these applications disclose various arrangements for such counter current heat exchanges.

Additional heat may be added at startup and in various conditions such as regenerative braking of a vehicle or elevator by application of electric current to heat resistor 412 which may be placed between a first tube 404 and a steam transport capillary 408 as shown. According to aspects of the disclosure, a second tube 402 may serve as a containment shield for air or refractory insulation in the space between the first tube 404 and the second tube 402.

Fuel such as methane that has been preheated by engine coolant is routed through the space between the second tube 404 and the steam transport capillary 408 as shown to react with steam and provide oxygenated fuel such as carbon monoxide along with hydrogen in a stream 416 as shown. Hot exhaust gases, including but not limited to steam, are delivered as a mixture through inlet 418; as the steam is depleted the cooled exhaust gases exit through outlet 420.

Suitable materials for the steam transport capillary 408 include graphene and other forms of carbon and boron nitride (disclosed in copending patent applications incorporated herein), and various refractory materials including but not limited to substrates that serve as pressure and temperature swing media for steam removal from mixtures with nitrogen, carbon dioxide, and oxygen.

In addition to production of oxygenated fuel species from hydrocarbons, another embodiment produces oxygenated fuel species from low cost fuels such as mixtures of alcohol, water and a carbon donor. Equation 503 summarizes the process for an alcohol such as butanol and a carbon donor, for example, a colloidal or otherwise suspended carbon, from a waste source.

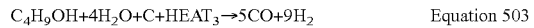

$$C_4H_9OH + 4H_2O + C + HEAT_3 \rightarrow 5CO + 9H_2 \qquad \text{Equation 503}$$

In this embodiment the water required for the process may be a combination of steam transported by the steam transport capillary 408 and water provided by the mixture of an alcohol, water and a suspended carbon donor. In this illustration, which is generally typical for various alcohols such as methanol, ethanol, butanol, or isopropanol, the carbon donor is depicted as "C" and the sum of steam that is transported by the steam transport capillary 408 and the water in solution is depicted as "nH$_2$O" or "4H$_2$O" for the illustrative process with butanol.

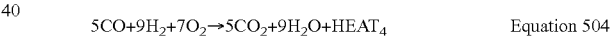

$$5CO + 9H_2 + 7O_2 \rightarrow 5CO_2 + 9H_2O + HEAT_4 \qquad \text{Equation 504}$$

If dry or 100% butanol is used as a feedstock for thermochemical production of oxygenated carbon and hydrogen as shown in Equation 503, only about 4/9 or 45% of the water produced by combustion of the products of Equation 503 are required to be delivered by the process depicted in FIG. 500.

Figure 5:
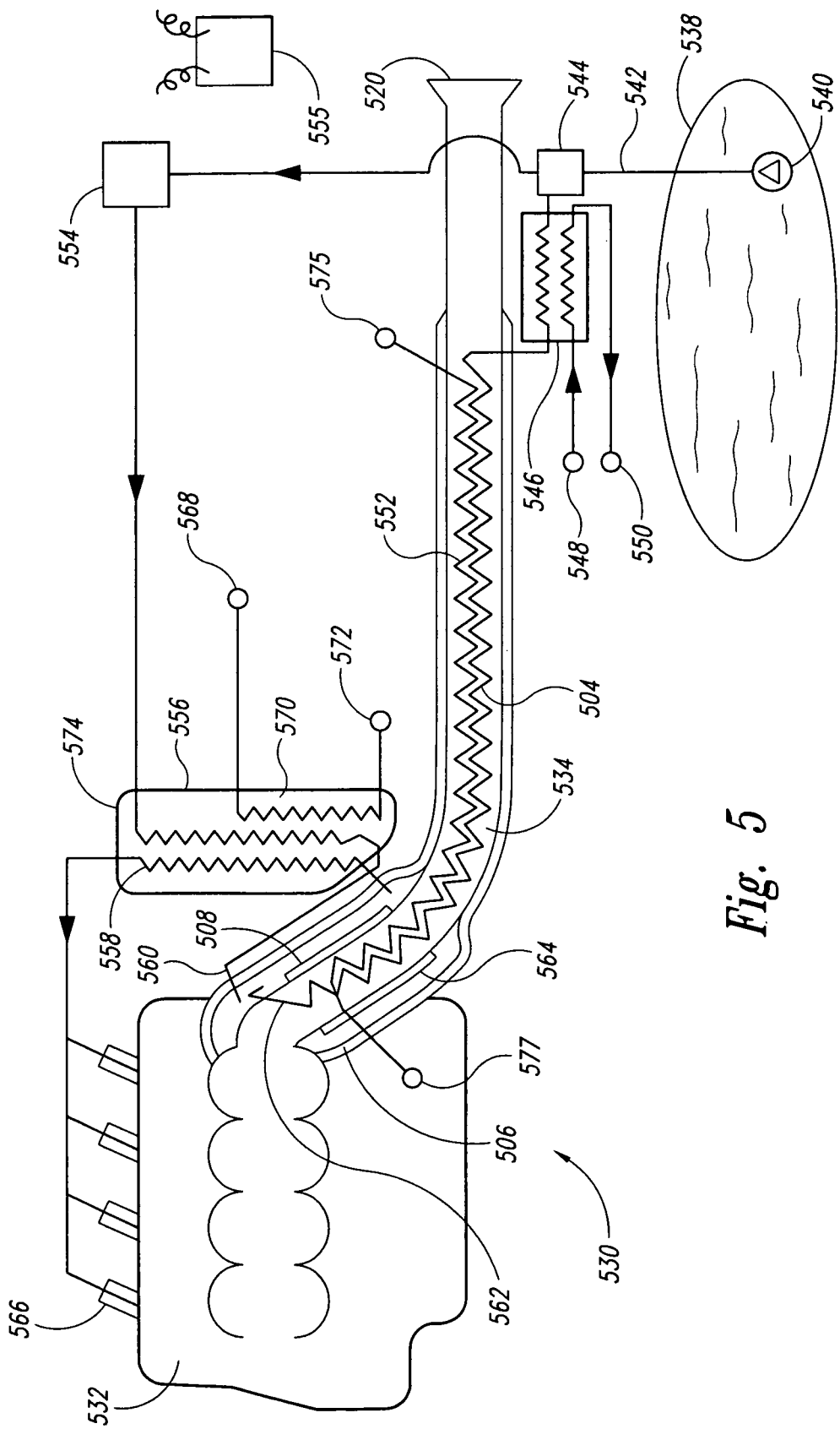
FIG. 5 is a schematic cross-sectional view of a system in accordance with the disclosure.

As shown in FIG. 5, a thermochemical regeneration system 530 is utilized with heat engine 532. The heat engine 532 provides heat from an engine coolant circuit that includes priority delivery of heat by a controller 555 through a "hot" connection or inlet 548. A cooler return 550 delivers coolant for subsequent heat rejection by a suitable system such as an air cooled radiator (not shown). This serves the purpose of preheating fuel delivered from a sufficiently pressurized tank source 538 or through pump 540 into line 542 and through valve 544 to heat exchanger 546 as shown. According to further aspects of the disclosure, preheated fuel may then be routed to another countercurrent heat exchanger 504 for heating such fuel by heat transfer from exhaust gases 534. According to one embodiment, the exhaust gases 534 may be routed through tubing 562 to reaction zone 506 for the carbon oxygenation process to produce fully oxygenated carbon monoxide along with hydrogen as summarized by Equation 501. Alternative configurations, as one skilled in the art would understand, are within the scope of the disclosure.

Hot steam from the exhaust stream passes across membrane 508 for supplying or supplementing other sources of water utilized in Equation 501. According to further aspects of the disclosure, regenerative energy as may be provided by energy harvesting operations such as regenerative braking or harvesting of combustion chamber energy sources including vibration, radiation, and pressure may be delivered to the tubular heat exchanger 504 by a suitable inductive or resistance heater 552 by connections 575, 577 as shown.

Considerable thermal banking or retention of such heat in surplus of the amount consumed by the endothermic process of Equations 501, 502 or 503 may be provided by material selections such as graphite or boron nitride. Alternatively or additionally, a change of phase heat exchanger and storage capability may be provided by substances such as salt compositions that change phase at a desired temperature such as at or above the temperature required for processes such as shown in Equations 501, 502 and 503. Such thermal banking materials and/or phase change storage may be provided in the zone between tubes 501 and 504 as shown. Fuels such as those shown in Equations 500, 502, and 503 are thus heated to adequate temperature for the reactions indicated and delivered to reaction zone 508 and 506 by insulated tubing 562 as shown.

The stream of hot fuel constituents such as hydrogen and carbon monoxide produced by reactions shown in Equations 501, 502 and 503, is cooled by counter current heat exchange with fuel from the tank 538. An optimization controller 555 controls fuel delivery through control valves 544 and 554. Accordingly, in operation, the fuel from tank 538 is heated to approximately the temperature of the products from the reactor 506, while the stream of hydrogen and carbon monoxide is cooled to nearly the temperature of fuel from tank 538.

This thermochemical regeneration system provides hydrogen-characterized fuel with superior heat removal capabilities for circulation within desired spaces and places for cooling one or more fuel injection valves 566, which in turn control direct fuel injection into the combustion chambers of the engine 532. A resistance or inductive heater 570 with connections 568, 572 may be utilized to further apply heat which has been generated from energy harvesting operations to increase the temperature of fuel delivered by insulated tubing 560 to reaction zone 506.

Illustratively, application of heat generated from energy harvesting operations as described above may provide or enhance plasma generation for use in facilitating the combustion event. Plasma generation in an oxidant such as air before each fuel injection creates thrust of ionized oxidant into the remaining oxidant within the combustion chamber. The inventory of ionized oxidant greatly accelerates ignition and completion of combustion of fuel that subsequently enters the combustion chamber. The pattern of ionized oxidant projecting into the combustion chamber helps impart the flow of remaining oxidant into fuel that follows the path of ionized air. Plasma generation within fuel entering the combustion chamber may be increased to provide sufficient electrical energy to accelerate the fuel for the purpose of overtaking the flow of ionized oxidant. In other modes plasma may be generated in fuel that is subsequently injected to produce additional groups of vectors that penetrate the oxidant within the combustion chamber. An example of such plasma thrusting of directed rays or vectors of plasma projected fuel are shown in concurrently filed applications incorporated by reference above. Plasma thrusting provides optimal utilization of the oxidant in the combustion chamber in instances that an asymmetric location is provided for fuel injector.

Modes of operating the system that intentionally bring a liquid phase fuel into the combustion chamber, or that convert the fuel into a gaseous phase on-demand, or that provide a desired fluid-gas mixture of fuel, utilize thermochemical regeneration to control the heat input (e.g. increase or decrease) to the fuel prior to injecting the fuel into the combustion chamber. For example, plasma induced fuel preparation and thrust generation is used to develop desired shapes and surface-to-volume characterizations of stratified fuel deliveries and enable efficient utilization of harvested energy. An illustrative embodiment provides for regenerative braking of a vehicle, elevator or similar event to produce electrical energy and/or conversion of combustion chamber sourced radiation, pressure, thermal or vibration energy whereby such harvested electricity is utilized to produce the desired plasma. Examples of plasma shaping and characterization of fuel injection and oxidation events include: plasma ionization of oxidant prior to the arrival of fuel; plasma ionization of oxidant prior to the arrival of fuel followed by continued ionization of injected fuel; plasma ionization of fuel that is injected into oxidant within the combustion chamber; plasma ionization of at least a layer of oxidant adjacent to a layer of fuel; plasma ionization of a layer of oxidant adjacent to a layer of fuel adjacent to a layer of oxidant; plasma ionization of a mixture of fuel and oxidant; plasma ionization of oxidant after any of the above described events; plasma production of ion currents that are electromagnetically thrust into the combustion chamber; and plasma production of ion currents that are electromagnetically thrust and magnetically accelerated to desired vectors within the combustion chamber.

Plasma thrusting of oxidant, mixtures of oxidant and fuel, or fuel ions is provided by the electromagnetic forces that are generated by high current discharges. The general approach of such plasma generation is disclosed in exemplary references such as U.S. Pat. Nos. 4,122,816; 4,774,914 and 5,076,223, herein incorporated in their entirety by reference, and may utilize various high voltage generation systems including the type disclosed in U.S. Pat. No. 4,677,960, herein incorporated in its entirety by reference. Shaping of the plasma that may be generated in oxidant, fuel, and/or mixtures of oxidant and fuel may be accomplished by an electromagnetic lens such as utilized to selectively aim streams of electrons in a cathode ray tube or as disclosed in U.S. Pat. No. 4,760,820, herein incorporated in its entirety by reference, regarding streams of ions. Generally it is undesirable to incur the engine efficiency penalty and loss of selectivity of the type of ion generation desired and adaptive ion distribution shaping capabilities that the present invention achieves by reliance upon a high-pressure fuel delivery system (such as a high-pressure fuel delivery system disclosed in U.S. Pat. No. 5,377,633, herein incorporated in its entirety by reference).

In operation, plasma generation in an oxidant, such as excess air, before each fuel injection event, selectively creates a thrust of ionized oxidant into the remaining oxidant within the combustion chamber. The inventory of ionized oxidant greatly accelerates ignition and completion of combustion of fuel that subsequently enters the combustion chamber.

The pattern of ionized oxidant projecting into the combustion chamber is controlled by the voltage and current applied to the plasma that is formed and helps impart the flow of remaining oxidant into fuel that follows the path of ionized air. Plasma generation within fuel entering the combustion chamber may be increased to provide sufficient electrical energy to electromagnetically accelerate the fuel for the purpose of overtaking the flow of ionized oxidant.

In other modes of operation plasma generation may be modulated by control of the voltage and amperage delivered in injected fuel to provide greater velocity and penetration of fuel-rich layers or bursts into an oxidant within the combustion chamber.

Figure 6:
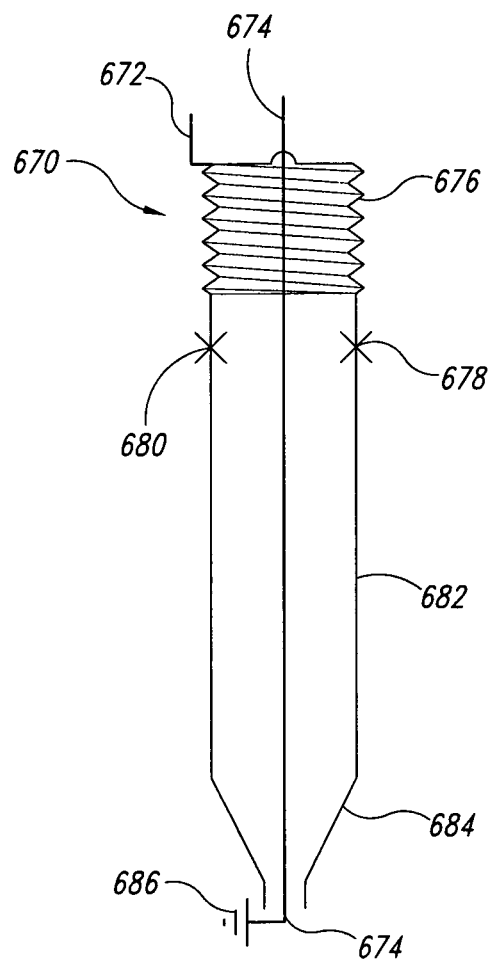
FIG. 6 is a schematic view of an alternative system in accordance with the disclosure.

As further shown in FIG. 6, one system 670 for delivering fuel from inlet 672 to the interface of a combustion chamber includes a voltage delivery source or first electrode 474 (shown the near electrically grounded location 486). Voltage sufficient to ionize fuel, fuel-oxidant mixtures or oxidant is delivered from the voltage delivery source or electrode 474 to second electrode 474' by a conductor contained within a suitable dielectric insulator. In accordance with aspects of the disclosure, fuel is delivered to a heat exchanger 476 (e.g. from a force generator, such as a solenoid winding) to remove heat from one or more valves 478, 480 such as a solenoid valve. At times of fuel injection, one or more channels or conduits including a coaxial delivery circuit 482 and 484 deliver fuel to the interface of a combustion chamber for ignition by plasma produced by electrodes 474, 474'.

Another embodiment of the disclosure provides for interchangeable utilization of fuel selections including mixtures of fuels such as diesel fuel; melted paraffin; gasoline; casing head or "drip" gasoline; methane; ethane; propane; butane; fuel alcohols; wet fuels such as 160-proof mixtures of water and one or more alcohols such as methanol, ethanol, butanol, or isopropanol; producer gas; and hydrogen. This is enabled by adaptive adjustment to provide sufficient plasma in each fuel injection delivery to suddenly produce fuel alterations including fuel evaporation/vaporization and chemical cracking to subdivide large molecules into smaller components including ionized species. Thus a wide variety of fuel selections, particularly very low cost fuels, are acceptable including fuels with contaminants such as water and cetane ratings that are far outside of acceptable "diesel fuel" specifications. Furthermore, the plasma may be generated by electrode nozzles that produce sufficient plasma thrust of such ionized fuel species to penetrate desired distances into oxidant within the combustion chamber to allow relatively low fuel delivery pressures compared to typical diesel fuel pressurization requirements for achieving similar oxidant utilization. This overcomes the disadvantages and limitations of cetane-characterized fuel selection, "diesel delay," knock and relatively uncontrolled peak combustion temperatures that characterize conventional compression-ignition systems.

Such plasma induced fuel preparation and thrust generation to develop desired shapes and surface-to-volume characterizations of stratified fuel deliveries enables efficient utilization of harvested energy. An illustrative embodiment provides for regenerative braking of a vehicle, elevator or similar event to produce electrical energy and/or conversion of combustion chamber sourced radiation, pressure, thermal or vibration energy whereby such harvested electricity is utilized to produce the desired plasma. This overcomes the substantial loss of engine efficiency due to the pressure-volume work required to compress an oxidant sufficiently to heat it 370° C. (700° F.) or more including losses of such work-generated heat through the intentionally cooled walls of the combustion chamber along with the substantial work required to pump and pressurize diesel fuel to high pressures such as 1360 bar (20,000 PSI).

It will be apparent that various changes and modifications can be made without departing from the scope of the disclosure. Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

Features of the various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the disclosure can be modified, if necessary, to employ fuel injectors and ignition devices with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. A fuel-cooled fuel injector configured to inject fuel into a combustion chamber, the fuel injector comprising:
   a body having a base portion opposite a nozzle portion, wherein the base portion is configured to receive the fuel into the body and the nozzle portion is configured to be positioned adjacent to the combustion chamber;
   a valve carried by the nozzle portion, wherein the valve is movable between a closed position and an open position to inject the fuel into the combustion chamber;
   an actuator coupled the valve and extending longitudinally through the body towards the base portion, the actuator includes a stop in the base portion;
   a driver independent of the valve and the actuator carried by the body and movable between a first position and a second position, in the first position the driver is spaced apart from the stop and in the second position the driver contacts the stop to move the actuator axially away from the nozzle portion to move the valve to the open position; and
   a plurality of passageways extending longitudinally through the driver configured to allow fuel to flow therethrough.

2. The fuel injector of claim 1 wherein the passageways are helical.

3. The fuel injector of claim 1 wherein driver includes a cavity extending longitudinally therethrough, and wherein the actuator is movably positioned in the cavity.

4. The fuel injector of claim 3 wherein the fuel flows through the cavity in the driver as the fuel flows from the base to the nozzle of the injector.

5. The fuel injector of claim 1, further comprising a biasing member carried by the base portion of the body, wherein the biasing member urges the driver towards the first position.

6. The fuel injector of claim 1 wherein when the driver is in the first position the driver contacts and at least partially retains the valve in the dosed position.

7. The fuel injector of claim 1, further comprising a force generator operably coupled to a controller, wherein the force generator induces the movement of the driver between the first and second positions to achieve desired fuel distribution via the valve.

8. The fuel injector of claim 1 wherein the driver at least partially gains momentum prior to contacting the actuator to move the valve to the open position.

9. The fuel injector of claim 1 wherein the actuator extends through the body coaxially within the driver.

10. The fuel injector of claim 1 wherein the actuator includes one or more monitoring fibers extending therethrough and operably coupled to the valve, wherein the one or more monitoring fibers are configured to detect one or more combustion chamber properties and transmit the one or more combustion chamber properties to a controller.

11. The fuel injector of claim 1 wherein the driver includes curvilinear passageways configured to allow fuel to flow therethrough.

12. The fuel injector of claim 3 wherein the body includes a plurality of ridges configured to allow fuel to flow around the driver within the driver cavity.

13. The fuel injector of claim 1 wherein the driver includes a plurality of cavities configured to allow fuel to flow therethrough.

14. The fuel injector of claim 1 wherein the driver is a solenoid winding configured to allow fuel to flow over the solenoid winding.

15. A method for providing oxygenated fuel to a combustion chamber of a fuel injector comprising:
    capturing waste heat from a source derived from a heat engine to drive endothermic reactions;
    transporting steam from a combustion event occurring in a combustion chamber of a fuel injector through capillaries in a body of the fuel injector;
    combining the waste heat with the steam wherein the waste heat is at a first temperature and the steam is at a second higher temperature than the waste heat; and
    reacting methane with steam to produce carbon monoxide and hydrogen.

16. The method of claim 15 wherein the capillary includes graphene, carbon, boron nitride and/or a refractory material.

17. A fuel injector configured to inject fuel into a combustion chamber, the fuel injector comprising:
    a body having a base portion opposite a nozzle portion, wherein the base portion is configured to receive the fuel into the body and the nozzle portion is configured to be positioned adjacent to the combustion chamber;
    a valve at the nozzle portion, wherein the valve is movable between a closed position and an open position;
    an actuator having a first end coupled to the valve and a second end portion opposite the first end portion, wherein the second end portion has a stop;
    a driver separable from the valve and the actuator positioned in the body and movable between first and second positions, in the first position the driver is spaced apart from the stop and in the second position the driver contacts the stop to move the actuator axially away from the nozzle portion to move the valve to the open position; and
    a countercurrent heat exchanger configured to exchange heat from exhaust gases to fuel in the body.

18. The fuel injector of claim 17, further comprising a pressurized storage tank and wherein the countercurrent heat exchanger is configured to preheat fuel from the pressurized storage tank.

19. The fuel injector of claim 17 wherein the driver includes an actuator opening extending longitudinally through a central portion of the driver, wherein the actuator extends through the actuator opening, wherein the driver is independently movable from the actuator, and wherein the driver and the actuator are fluidicly connected.

20. The fuel injector of claim 19 wherein the driver further includes a fuel passageway spaced radially apart from the actuator opening and extending longitudinally through the driver, wherein the fuel passageway is configured to allow fuel to flow through the driver.

* * * * *